United States Patent
Borland

(10) Patent No.: US 6,219,824 B1
(45) Date of Patent: Apr. 17, 2001

(54) INTEGRATED CIRCUIT HAVING A PROGRAMMABLE INPUT/OUTPUT PROCESSOR THAT IS USED FOR INCREASING THE FLEXIBILITY OF COMMUNICATIONS

(75) Inventor: David J. Borland, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/148,103

(22) Filed: Sep. 4, 1998

(51) Int. Cl.[7] .............. G06F 17/50; G06F 12/00; G06F 7/38; H01L 25/00
(52) U.S. Cl. .............. 716/17; 711/200; 711/202; 716/16; 326/38; 326/41
(58) Field of Search .............. 711/202; 716/17; 326/41, 38

(56) References Cited

U.S. PATENT DOCUMENTS

| | | | |
|---|---|---|---|
| 5,640,106 | * | 6/1997 | Erickson et al. ............ 326/38 |
| 5,644,496 | * | 7/1997 | Agrawal et al. ............ 716/17 |
| 5,682,107 | * | 10/1997 | Tavana et al. ............ 326/41 |
| 5,687,325 | * | 11/1997 | Chang ............ 716/17 |
| 5,692,147 | * | 11/1997 | Larsen et al. ............ 711/202 |

* cited by examiner

*Primary Examiner*—Matthew Smith
*Assistant Examiner*—Jibreel Speight
(74) *Attorney, Agent, or Firm*—Conley, Rose & Tayon PC; Jeffrey C. Hood

(57) ABSTRACT

A system and method for increasing the flexibility of communications being performed by an integrated circuit Specifically, an integrated circuit including a programmable input/output processor and an attendant method of use thereof are disclosed. The integrated circuit comprises a main functional unit operable to perform a computing function and to fulfill an input/output (I/O) request, a memory coupled to the main functional unit, a programmable logic coupled to the main functional unit; and a plurality of I/O pads coupled to the programmable logic. The memory is operable to store one or more of a plurality of configurations for the programmable logic. The main functional unit is further operable to read the one or more of the plurality of configurations stored in the memory. The main functional unit is also operable to configure the programmable logic with a desired configuration from the plurality of configurations. The desired configuration operates to configure the programmable logic to fulfill the I/O request. Each of the plurality of configurations is operable to control a transmission of data to or from one or more of the plurality of I/O pads. The main functional unit may also store a new configuration in the memory. The integrated circuit may also comprise a direct memory access (DMA) controller coupled to the main functional unit and to the memory. The main functional unit is then further operable to program the DMA controller to fulfill the I/O request independently of the main functional unit.

6 Claims, 3 Drawing Sheets

INTEGRATED CIRCUIT HAVING A PROGRAMMABLE INPUT/OUTPUT PROCESSOR THAT IS USED FOR INCREASING THE FLEXIBILITY OF COMMUNICATIONS

BACKGROUND OF THE INVENTION

1. Field of the Invention

This invention relates to integrated circuits in general and, more particularly, to a computer chip including a programmable input/output processor.

2. Description of Related Art

The concepts of integrated circuits and computer systems are generally well known. A typical computer system is made up of a multitude of different, specialized computer chips. Chip makers can now place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are evolving toward comprising a handful of computer chips, where each computer chip comprises a plurality of functions. Economies of scale in manufacturing require that start-up costs be amortized over as many pieces of product as possible to keep per-unit costs low. Custom integrated circuits are usually only produced in limited numbers, making the per-unit costs much higher than standard integrated circuits. This makes many custom integrated circuits uncompetitive in the marketplace. Therefore, an improved system is desired which allows a variety of custom integrated circuits to be designed and manufactured as a single integrated circuit, so that start-up costs can be amortized over a plurality of different integrated circuit products. Even better would be a way to allow custom integrated circuits to replace a standard integrated circuit without requiring a complete redesign of the motherboard layout.

SUMMARY OF THE INVENTION

The present invention comprises a system and method for increasing the flexibility of communications being performed by an integrated circuit. Specifically, an integrated circuit including a programmable input/output processor and a method of use thereof are disclosed. The integrated circuit comprises a main functional unit operable to perform a computing function and to fulfill an input/output (I/O) request, a memory coupled to the main functional unit, a programmable logic coupled to the main functional unit; and a plurality of I/O pads coupled to the programmable logic. The memory is operable to store one or more of a plurality of configurations for the programmable logic. The main functional unit is further operable to read the one or more of the plurality of configurations stored in the memory. The main functional unit is also operable to configure the programmable logic with a desired configuration from the plurality of configurations. The desired configuration operates to configure the programmable logic to fulfill the I/O request. Each of the plurality of configurations is operable to control a transmission of data to or from one or more of the plurality of I/O pads.

In one embodiment, the main functional unit is further operable to store a new configuration in the memory. The integrated circuit may further comprise a direct memory access (DMA) controller coupled to the main functional unit and to the memory. The main functional unit is then further operable to program the DMA controller to fulfill the I/O request independently of the main functional unit. In another embodiment, each of the plurality of configurations includes a source of the data, a destination for the data, and a size of the data. In still another embodiment, each of the plurality of configurations further includes a desired latency for the I/O request for the data and a desired priority for the I/O request for the data.

The method is preferably for operating a system comprising an integrated circuit. The integrated circuit includes a main functional unit operable to perform a processing function, a memory coupled to the main functional unit, a programmable logic coupled to the main functional unit; and a plurality of input/output (I/O) pads coupled to the programmable logic. The memory is operable to store one or more of a plurality of I/O configurations. The method comprises powering on the system into a default state; the main functional unit receiving an I/O request for data; the main functional unit reading an I/O configuration stored in the memory; the main functional unit programming the programmable logic to fulfill the I/O request for the data; and the main functional unit fulfilling the I/O request for the data through the programmable logic to the I/O pads in the desired manner. The programming preferably comprises configuring the programmable logic with an I/O configuration to provide the data to the I/O pads in a desired manner prescribed in the I/O request for the data. In one embodiment, the configuring is chosen from a plurality of I/O configurations for the programmable logic.

In another embodiment when the integrated circuit further includes a direct memory access (DMA) controller coupled to the main functional unit and to the memory, the method further comprises the main functional unit programming the DMA controller to oversee the I/O request for the data and the DMA controller fulfilling the I/O request for the data through the programmable logic to the I/O pads in the desired manner. The DMA controller preferably fuilfills the I/O request instead of the main functional unit fulfilling the I/O request.

BRIEF DESCRIPTION OF THE DRAWINGS

A better understanding of the present invention can be obtained when the following detailed description of the preferred embodiment is considered in conjunction with the following drawings, in which.

Figure 1:
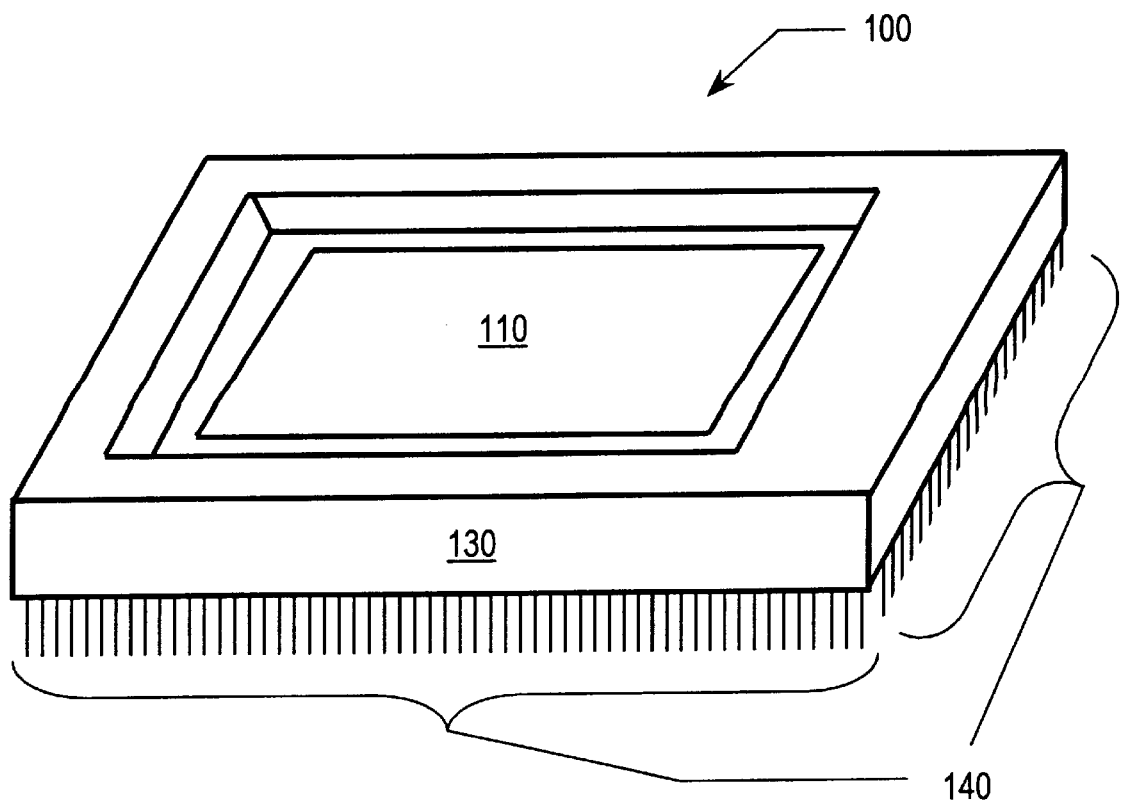
FIG. 1 illustrates a prospective, cut-away view of an embodiment of a computer chip.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF PREFERRED EMBODIMENTS

The present invention comprises a system and method for increasing the flexibility of communications being performed by an integrated circuit. Specifically, an integrated circuit including a programmable input/output (I/O) processor and a method of use thereof are disclosed. The use of a letter as part of a number designating a component of a system described in this document will be to show multiple instances of equivalent components. All figures will use a uniform numbering system with identical or similar parts across the figures being given identical numbers FIG. 1—Computer Chip Turning now to the drawings, FIG. 1 shows a computer chip 100. As illustrated, the computer chip 100 comprises a semiconductor device, or integrated circuit 110, configurable to perform a computing or storage function and a packaging element 130 surrounding and protecting the semiconductor device 110. As shown, the computer chip 100 also includes pins 140, which electrically couple the integrated circuit 110, through the packaging 130 to an external device (not shown). The pins 140 are optional for computer chip 100 and may be replaced by other connection means.

The computer chip 100 may further comprise signal lines (not shown, but see FIG. 2) formed upon a substrate of the semiconductor device 110, as are well known in the art. The signal lines are operable to convey electrical communication signals. I/O pads 240 (see FIG. 2), also well known in the art, terminate various ones of the signal lines and are operable to provide metal contacts for attaching the signals lines to the packaging element 130. Terminals, such as the pins 140, operable to couple the computer chip 100 to a holder, or other device, may also be included to provide electrical contact and communication lines for the computer chip 100. The terminals may be pins 140 or leads, as desired, to connect to holes or metal contact regions of the holder.

The integrated circuit 110 preferably comprises a monolithic silicon substrate comprising a plurality of transistors. The semiconductor device 110 may also use gallium arsenide (GaAs) or another suitable semiconductor material. Although shown as a ceramic socket mount pin grid array (PGA) package 130, the computer chip 100 may be packaged in any of various ways, including as a surface mount, socket mount, or insertion/socket mount. Materials used in the packaging 130 of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method. Further details of the preferred components of the computer chip will be given in the description of FIG. 2.

Figure 2:
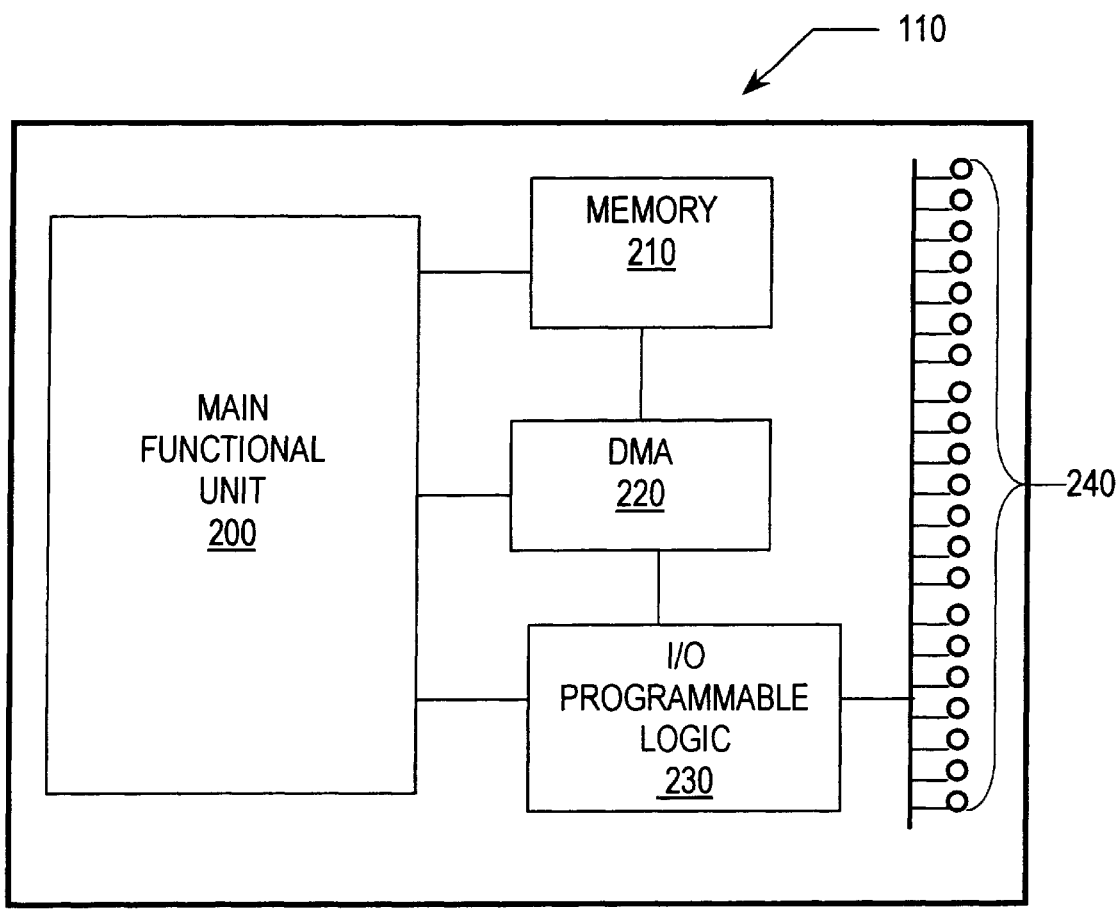
FIG. 2 illustrates a block diagram of an embodiment of an integrated circuit comprising programmable input/output logic, according to the present invention.

FIG. 2—Integrated Circuit with Programmable I/O Logic

Referring now to Fig, 2, an embodiment of the integrated circuit 110 is shown. A main functional unit 200 provides all primary functions of the integrated circuit 100. It is contemplated that the main functional unit may be as simple as a processor or as complex as a interconnected system of processing modules similar to those disclosed in co-pending patent application entitled "Flexible Buffering Scheme for Inter-Module On-Chip Communications" by Alfred C. Hartmann, filed on Jul. 14, 1997, which is hereby incorporated by reference in its entirety. As shown, coupled to the main functional unit 200 are a memory 210, a direct memory access (DMA) controller 220, and a programmable I/O logic 230. The memory 210 and the programmable I/O logic 230 are also coupled to the DMA controller 220. The programmable I/O logic 230 is further coupled to a plurality of I/O pads 240, which provide physical and electrical connections for coupling the integrated circuit 110 to an external device or system.

The main functional unit 200 is operable to perform at least a computing function and to fulfill an I/O request. The memory is operable to store one or more of a plurality of configurations for the I/O programmable logic 230. The main functional unit 200 is further operable to read any of the plurality of configurations stored in the memory 210. The main functional unit 200 is also operable to configure the programmable I/O logic 230 with a desired configuration from the plurality of configurations. The desired configuration operates to configure the programmable I/O logic 230 to fulfill the I/O request. Each of the plurality of configurations is operable to control a transmission of data to or from one or more of the plurality of I/O pads 240.

In one embodiment, the main functional unit 200 is further operable to store a new configuration in the memory 210. In the embodiment where the integrated circuit 110 comprises the DMA controller 220, the main functional unit 200 is further operable to program the DMA controller 220 to fulfill the I/O request independently of the main functional unit 200. In various embodiments, one or more of the plurality of configurations includes a plurality of a source of the data, a destination for the data, a size of the data, a desired latency for the I/O request for the data, and a desired priority for the I/O request for the data. Other configuration information is also contemplated.

Figure 3:
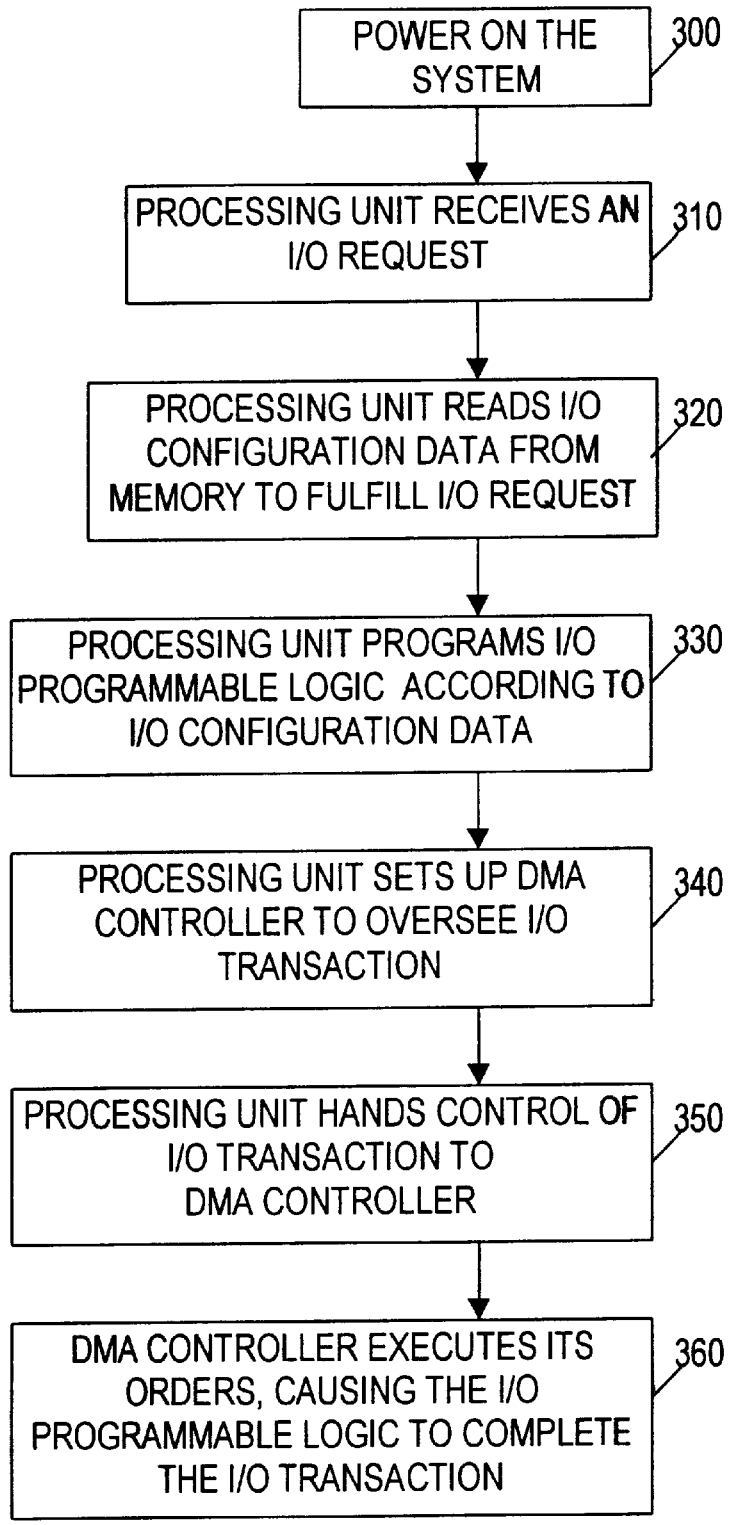
FIG. 3 illustrates a flowchart of an embodiment of a method for controlling input/output in the computer chip of FIG. 2, according to the present invention.

FIG. 3—Method of Operation

FIG. 3 illustrates a flowchart of an embodiment of a method for controlling responses to requests for I/O in the integrated circuit 110 of FIG. 2, according to the present invention. The preferred system for carrying out the method is the integrated circuit 110 of FIG. 2, with the main functional unit 200 acting as a processing unit. As shown in FIG. 3, the method comprises the following procedures. First, power on the system 300. Next, the processing unit 200 receives an I/O request 310. The processing unit 200 reads I/O configuration data from the memory 210 to fulfill the I/O request 320. The processing unit 200 next programs the programmable I/O logic 330 according to the I/O configuration received in 320. The processing unit 200 sets up the DMA controller 220, if present, to oversee the fulfillment of the I/O transaction 340. In 350, the processing unit 200 hands control of the I/O request fulfillment over to the DMA controller 220 that was programmed in 340. Finally, either the processing unit 200 or the DMA controller 220 fulfill the I/O request by causing the programmable I/O logic 230 to complete I/O transaction 360 to the I/O pads in the desired manner.

The memory 210 is operable to store one or more of a plurality of I/O configurations that may be used to fulfill the I/O request. through the programmable logic to the I/O pads in the desired manner. The programming 330 preferably comprises configuring the programmable I/O logic 230 with an I/O configuration to provide the data to the I/O pads 240 in a desired manner prescribed in the I/O request for the data. In one embodiment, the configuring is chosen from a plurality of I/O configurations for the programmable I/O logic 230. The method optionally includes the main functional unit 200 programming the DMA controller 220 to oversee the I/O request for the data and the DMA controller 220 fulfilling the I/O request for the data through the programmable I/O logic 230 to the I/O pads 240 in the desired manner. When present, the DMA controller 220 preferably fulfills the I/O request, instead of the main functional unit 200 fulfilling the I/O request.

Therefore, the present invention comprises a system and method for increasing the flexibility of communications being performed by an integrated circuit. Although the system and system of the present invention have been described in connection with the preferred embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An integrated circuit, comprising:
   a main functional unit operable to perform a computing function, wherein the main functional unit is further operable to fulfill an input/output (110) request;
   a memory coupled to the main functional unit, a programmable logic coupled to the main functional unit; and
   a plurality of I/O pads coupled to the programmable logic;
   wherein the memory is operable to store one or more of a plurality of configurations for the programmable logic, wherein the main functional unit is further operable to read the one or more of the plurality of configurations stored in the memory, wherein the main functional unit is operable to configure the programmable logic with a desired configuration of the plurality of configurations, wherein the desired configuration operates to configure the programmable logic to fulfill the 110 request, wherein each of the plurality of configurations are operable to control a transmission of data to or from one or more of said plurality of 110 pads; and
   a direct memory access (DMA) controller coupled to the main functional unit, wherein the DMA controller is further coupled to the memory, and wherein the DMA controller is further coupled to the programmable logic;
   wherein the main functional unit is further operable to program the DMA controller to fulfill the 110 request independently of the main functional unit.

2. The integrated circuit of claim 1, wherein the main functional unit is further operable to store a new configuration in the memory.

3. The integrated circuit of claim 1, wherein said each of the plurality of configurations includes:
   a source of the data;
   a destination of the data; and
   a size of the data.

4. The integrated circuit of claim 3, wherein said each of the plurality of configurations further includes:
   a desired latency for the I/O request for the data; and
   a desired priority for the I/O request for the data.

5. A method of operating a system comprising an integrated circuit, wherein the integrated circuit includes a main functional unit operable to perform a computing function, a memory coupled to the main functional unit, a programmable logic coupled to the main functional unit; and a plurality of input/output (I/O) pads coupled to the programmable logic, wherein the memory is operable to store one or more of a plurality of I/O configurations; the method comprising:
   powering on the system into a default state;
   the main functional unit receiving an 110 request for data;
   the main functional unit reading an I/O configuration stored in the memory;
   the main functional unit programming the programmable logic to fulfill the I/O request for the data, wherein the programming comprises configuring the programmable logic with an I/O configuration to provide the data to the I/O pads in a desired manner prescribed in the I/O request for the data;
   the main functional unit fulfilling the I/O request for the data through the programmable logic to the I/O pads in the desired manner;
   wherein the integrated circuit further includes a direct memory access (DMA) controller coupled to the main functional unit, wherein the DMA controller is further coupled to the memory, and wherein the DMA controller is further coupled to the programmable logic, the method further comprising:
   the main functional unit programming the DMA controller to oversee the I/O request for the data; and
   the DMA controller fulfilling the I/O request for the data through the programmable logic to the I/O pads in the desired manner. wherein the DMA controller fulfilling the I/O request occurs instead of the main functional unit fulfilling the I/O request.

6. The method of claim 5, wherein the reading the I/O configuration operates to read a selected I/O configuration from the one or more of the plurality of I/O configurations for the programmable logic.

* * * * *

UNITED STATES PATENT AND TRADEMARK OFFICE
CERTIFICATE OF CORRECTION

PATENT NO. : 6,219,824 B1  
DATED : April 17, 2001  
INVENTOR(S) : David J. Borland Page 1 of 1

It is certified that error appears in the above-identified patent and that said Letters Patent is hereby corrected as shown below:

Column 5, claim 1,
Line 33, please delete "110" and substitute -- I/O --.
Line 35, please delete "110" and substitute -- I/O --.
Line 42, please delete "110" and substitute -- I/O --.

Column 6, claim 4,
Line 18, please delete "110" and substitute -- I/O --.

Signed and Sealed this

Twentieth Day of November, 2001

Attest:

NICHOLAS P. GODICI
*Attesting Officer*   *Acting Director of the United States Patent and Trademark Office*